United States Patent
Ye et al.

(10) Patent No.: US 9,536,205 B2
(45) Date of Patent: Jan. 3, 2017

(54) ADAPTIVE CONTROL OF HYBRID ULTRACAPACITOR-BATTERY STORAGE SYSTEM FOR PHOTOVOLTAIC OUTPUT SMOOTHING

(71) Applicant: NEC Laboratories America, Inc., Princeton, NJ (US)

(72) Inventors: Yanzhu Ye, San Jose, CA (US); Ratnesh K Sharma, Fremont, CA (US); Di Shi, San Jose, CA (US)

(73) Assignee: NEC Corporation (JP)

( * ) Notice: Subject to any disclaimer, the term of this patent is extended or adjusted under 35 U.S.C. 154(b) by 215 days.

(21) Appl. No.: 14/162,732

(22) Filed: Jan. 23, 2014

(65) Prior Publication Data

US 2014/0236883 A1 Aug. 21, 2014

Related U.S. Application Data

(60) Provisional application No. 61/756,296, filed on Jan. 24, 2013.

(51) Int. Cl.
*G06N 7/02* (2006.01)

(52) U.S. Cl.
CPC .................. *G06N 7/02* (2013.01); *Y02E 10/50* (2013.01); *Y02E 40/76* (2013.01); *Y04S 10/545* (2013.01)

(58) Field of Classification Search
None
See application file for complete search history.

(56) References Cited

U.S. PATENT DOCUMENTS

| 8,719,195 | B2* | 5/2014 | Frisch | G06N 99/005 320/137 |
| 2012/0133209 | A1* | 5/2012 | O'Brien | H02J 3/1828 307/72 |
| 2013/0099581 | A1* | 4/2013 | Zhou | H02J 1/12 307/82 |
| 2015/0002105 | A1* | 1/2015 | Kelly | H02J 7/007 320/162 |

OTHER PUBLICATIONS

Thounthong, P.; Sikkabut, S.; Luksanasakul, A.; Koseeyaporn, P.; Sethakul, P.; Pierfederici, S.; Davat, B., "Fuzzy logic based DC bus voltage control of a stand alone photovoltaic/fuel cell/supercapacitor power plant," in Environment and Electrical Engineering (EEEIC), 2012 11th International Conference on , vol., No., pp. 725-730, May 18-25, 2012.*

(Continued)

*Primary Examiner* — Stanley K Hill
*Assistant Examiner* — David H Kim
(74) *Attorney, Agent, or Firm* — Joseph Kolodka (57) ABSTRACT

A hybrid ultracapacitor-battery energy storage system is integrated with a photovoltaic system to help solve fluctuations. A fuzzy-logic-based adaptive power management system enables optimization of the power/energy distributions and a filter-based power coordination layer serving as a rudimentary step for power coordination among the hybrid storage system and a fuzzy-logic-based control adjustment layer that keeps monitoring the operation status of all the energy storage devices, taking into account their dynamic characteristics, and fine-tuning the control settings adaptively.

10 Claims, 5 Drawing Sheets

(56) References Cited

OTHER PUBLICATIONS

Haihua Zhou; Bhattacharya, T.; Duong Tran; Siew, T.S.T.; Khambadkone, A.M., "Composite Energy Storage System Involving Battery and Ultracapacitor With Dynamic Energy Management in Microgrid Applications," in Power Electronics, IEEE Transactions on , vol. 26, No. 3, pp. 923-930, Mar. 2011.*

Zandi, M.; Payman, A.; Martin, J.-P.; Pierfederici, S.; Davat, B.; Meibody-Tabar, F., "Energy Management of a Fuel Cell/Supercapacitor/Battery Power Source for Electric Vehicular Applications," in Vehicular Technology, IEEE Transactions on , vol. 60, No. 2, pp. 433-443, Feb. 2011.*

Glavin, M.E.; Hurley, W.G., "Ultracapacitor/battery hybrid for solar energy storage," in Universities Power Engineering Conference, 2007. UPEC 2007. 42nd International , vol., No., pp. 791-795, Sep. 4-6, 2007.*

O. Erdinc, B. Vural, M. Uzunoglu, A wavelet-fuzzy logic based energy management strategy for a fuel cell/battery/ultra-capacitor hybrid vehicular power system, Journal of Power Sources, vol. 194, Issue 1, Oct. 20, 2009, pp. 369-380.*

Ise, Toshifumi, Masanori Kita, and Akira Taguchi. "A hybrid energy storage with a SMES and secondary battery." Applied Superconductivity, IEEE Transactions on 15.2 (2005): 1915-1918.*

\* cited by examiner

Fig. 5 (a) Input

Fig. 5 (b) Output

Fig. 6

Fig. 7 (a) Input

Fig. 7 (b) Output

Fig. 8

Fig. 9 (b) Input

Fig. 9 (a) Input

ADAPTIVE CONTROL OF HYBRID ULTRACAPACITOR-BATTERY STORAGE SYSTEM FOR PHOTOVOLTAIC OUTPUT SMOOTHING

RELATED APPLICATION INFORMATION

This application claims priority to provisional application No. 61/756,296 entitled "Adaptive control of hybrid Ultracapitor-Battery Storage System for PV Output Smoothing", filed Jan. 24, 2013, the contents thereof are incorporated herein by reference

BACKGROUND OF THE INVENTION

The present invention relates generally to energy systems, and more particularly, to adaptive control of hybrid ultracapacitor-battery storage system for photovoltaic PV output smoothing.

With the high levels of penetrations of renewable energy resources in a power grid, e.g. Photovoltaic (PV), the system encounters challenges, e.g. power quality, voltage impact, etc. One of the concerns comes from the short-term high-frequency variances of the PV generation during unpredictable sudden weather changes, which has been reported at some central generation stations. A great effort has been put in the mitigation of the short-term fluctuation of PV power generation, which is generally referred to as smoothing or ramp-rate control. The perspective solution is to add proper energy storage buffer and active management system to mitigate the impact of short-term variances. The batteries, as the most common energy storage devices, have high energy density, but relatively low power density. Usually the PV power output smoothing requires frequent and high charging/discharging power from storage devices, which will greatly shorten the battery life.

In the literature, various control techniques have been recommended by researchers, for single-type or hybrid energy storage system. The power management system smooth out the PV power fluctuations through scheduling power generation or consumption among different energy storage devices. The power scheduling approaches include frequency-spectrum-based, constant-power-based, knowledge-based, rule-based, etc.

Accordingly, a hybrid energy storage system is needed to effectively utilize the characteristic of different storage devices, such as the ultracapacitor (UC), featured with high power density and relatively low energy density, and that can compensate for the battery system and alleviate the high power burden on battery system.

BRIEF SUMMARY OF THE INVENTION

The present invention is directed to a system that includes a fuzzy logic-based adaptive power management system, a photovoltaic system, a first capacitor based energy storage system, a second battery energy based storage system, and a storage of knowledge of system operation and operation of energy storage related devices within the system, wherein the management storage system communicates with the photovoltaic system, first capacitor and battery based energy system and storage of knowledge to influence energy fluctuations ahead of detailed control loops in power electronic devices, the fuzzy logic based adaptive system includes a filter based power coordination layer for power conditioning among the energy based storage system and a fuzzy logic based control adjustment for monitoring operational status of all energy storage devices taking into account their dynamic characteristics to fine tune control settings with the system adaptively and influence optimal power or energy distributions within the system.

In an alternative expression of the invention, a method includes employing a fuzzy logic-based adaptive power management system in a an electrical energy system, coupling a photovoltaic system to the power management system, coupling a first capacitor based energy storage system to the power management system, coupling a second battery energy based storage system to the power management system, and coupling a storage of knowledge of system operation and operation of energy storage related devices within an electric energy system to the power management system, the management storage system communicating with the photovoltaic system, first capacitor and battery based energy system and storage of knowledge for influencing energy fluctuations ahead of detailed control loops in power electronic devices, the fuzzy logic based adaptive system including a filter based power coordination layer for power conditioning among the energy based storage system and a fuzzy logic based control adjustment for monitoring operational status of all energy storage devices taking into account their dynamic characteristics for fine tuning control settings with the system adaptively and influencing optimal power or energy distributions within the system.

These and other advantages of the invention will be apparent to those of ordinary skill in the art by reference to the following detailed description and the accompanying drawings.

BRIEF DESCRIPTION OF THE DRAWINGS

FIGS. 5 (a) and (b) show membership functions of input and output variables for the controller 1;

FIGS. 7 (a) and (b) show membership functions of input and output variables of the UC controller;

FIGS. 9 (a) and (b) show membership functions of input and output variables of the BE controller.

DETAILED DESCRIPTION

The present invention is directed to a hybrid ultracapacitor-battery (UC-battery) energy storage system that is integrated with a PV system to help solve fluctuating issues. The invention focuses on the design of power management system (PMS) which deals with the power and energy sharing among energy storage devices, instead of the detailed control loops in those power electronics devices (e.g. converters, inverters). A fuzzy-logic-based adaptive PMS enables optimization of the power/energy distributions. The proposed PMS has two layers. The first filter-based power coordination layer serves as a rudimentary step for power coordination among the hybrid storage system. The second fuzzy-logic-based control adjustment layer keeps monitoring the operation status of all the energy storage devices, takes into account of their dynamic characteristics, and fine-tunes the control settings adaptively.

Figure 1:
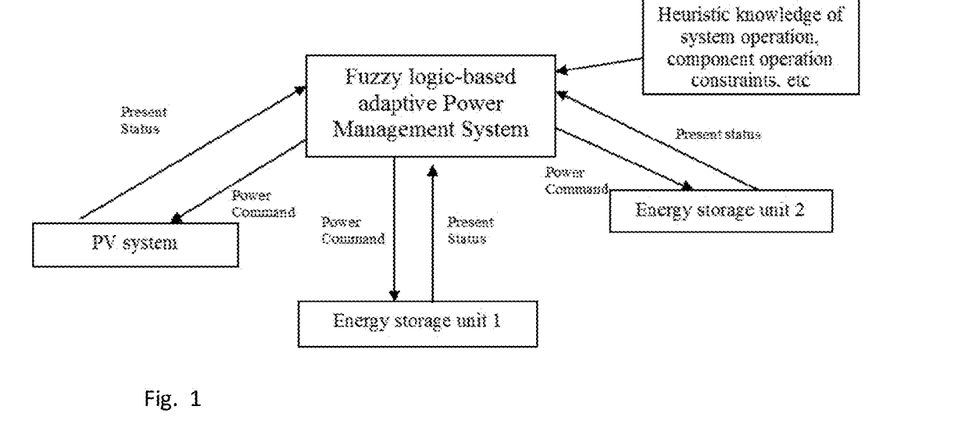
FIG. 1 is system diagram of an exemplary hybrid UC-battery energy storage system, accordance with the invention.

Referring now to FIG. 1, there is shown a system diagram of an exemplary hybrid UC-battery energy storage system, in accordance with the invention. The fuzzy logic-based adaptive power management system communicates bi-directionally, present status and power command information, with a photovoltaic system, and energy storage units 1, 2, and has access to information such as heuristic knowledge of system operation, component operation constraints, etc.

Figure 2:
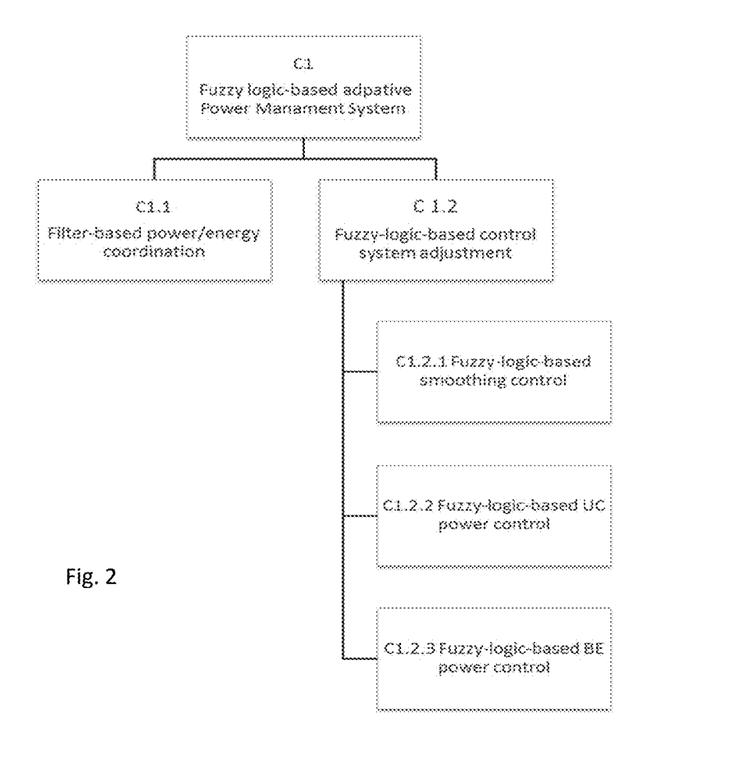
FIG. 2 is a diagram of aspects of the invention.

Referring to FIG. 2, there is shown a diagram of aspects of the invention. The fuzzy logic based adaptive power management system C1 includes a filter based power/energy coordination aspect C1.1, and a fuzzy logic based control system adjustment aspect C1.2. The fuzzy logic based control system adjustment aspect includes smoothing control C1.2.1, UC power control C1.2.2 and BE power control C1.2.3.

C.1: Fuzzy-Logic-Based Adaptive Power Management System for Hybrid ESS Control

Figure 3:
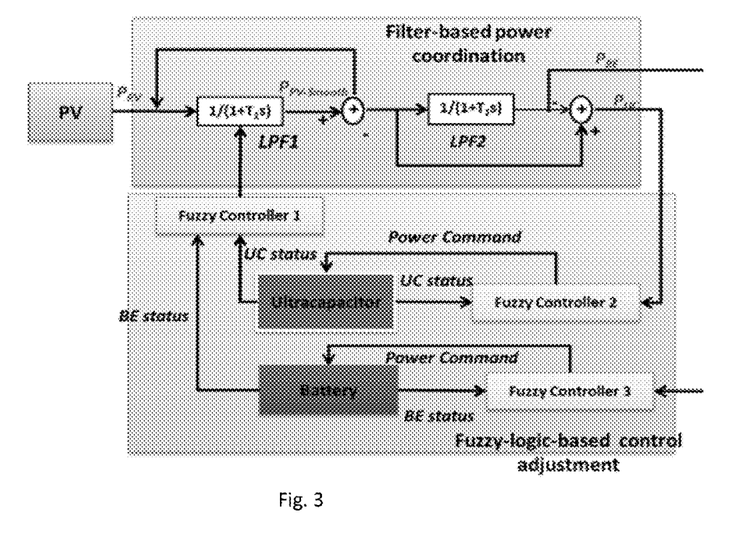
FIG. 3 is a diagram of fuzzy-logic-based PMS, in accordance with the invention.

The power management system for hybrid ESS control to smooth the PV power output has two major layers. The first one is the filter-based power coordination among energy storage devices. The second is the fuzzy-logic-based adjustment layer, which adjust the power dispatching, control parameter settings, etc. The power management system PMS diagram is shown in FIG. 3. The PV signal PPV from the photovoltaic PV system is coupled to the filter-based power coordination that includes low pass filters LPF1, LPF2, and feedback loops for $P_{PV}$ smoothing and ultracapacitor UC and battery energy power BE signals $P_{UC}$ and $P_{BE}$, respectively. The fuzzy logic based control system adjustment, responsive to $P_{UC}$ and $P_{BE}$ inputs, employs power controller 2, 3 for the battery and ultracapacitor to provide BE and UC status signals fuzzy controller 1.

C1.2. Filter-Based Power Coordination

The filter-based power coordination approach serves as a rudimentary step for the hybrid storage system operation. It ensures that the supercapacitor storage device compensates sudden changes in the rapidly fluctuating PV output power while the battery covers a smoothing power profile. During normal operation periods, the references for different energy storage devices will work reasonably well; however, it is necessary to modify the references under certain conditions in order to improve the overall system performance. So another control layer (C1.3) is added and takes the input from C1.2.

If there are more types of energy storage devices involved, extra proper filters can be designed and added. Different types of energy storage device compensate different part of fluctuating powers based on their own dynamic characteristics.

C1.3 Fuzzy-Logic-Based Control System Adjustment

Different type of energy storage component has its unique dynamic characteristics and operation concerns. During the system operation, the energy storage device will keep switching among different operation modes and present different dynamics. In order to achieve smooth changes over various operation modes and maintain consistent system performance, it is essential to tune the control schemes along with those changes. The fuzzy logic has its unique advantages in non-linear system control and does not require a precise mathematical modeling or sophisticated computations in most cases. The fuzzy-logic-based control system adjustment layer contains three major fuzzy logic controllers: Fuzzy-logic based smoothing control; fuzzy-logic-based battery power control; fuzzy-logic-based UC power control.

C.1.2.1. Fuzzy-Logic-Based Smoothing Control

The lower pass filter (LPF1) in FIG. 3 determines the smoothing power profile. The difference between $P_{PV,smooth}$ and the actual PV power ($P_{pv}$) is covered by discharging or charging the hybrid EES. The parameter $T_1$ greatly determines the smoothing performance, the larger the $T_1$ is, the more fluctuating power needs to be compensated by the hybrid ESS, which means more energy and power will be requested out of energy storages. With limited energy capacity of storage devices, the system operation may not be sustainable for a long time when the capacity of the energy storage are depleted or saturated.

Figures 4, 5:
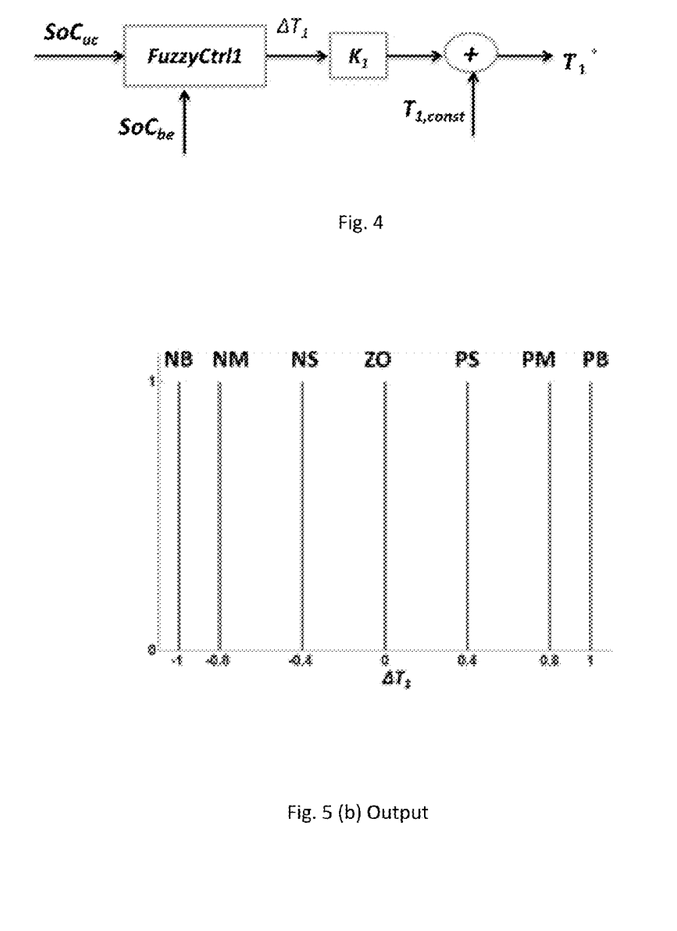
FIG. 4 shows a block diagram of a Fuzzy logic smoothing controller 1, in accordance with the invention.
Figure 5:
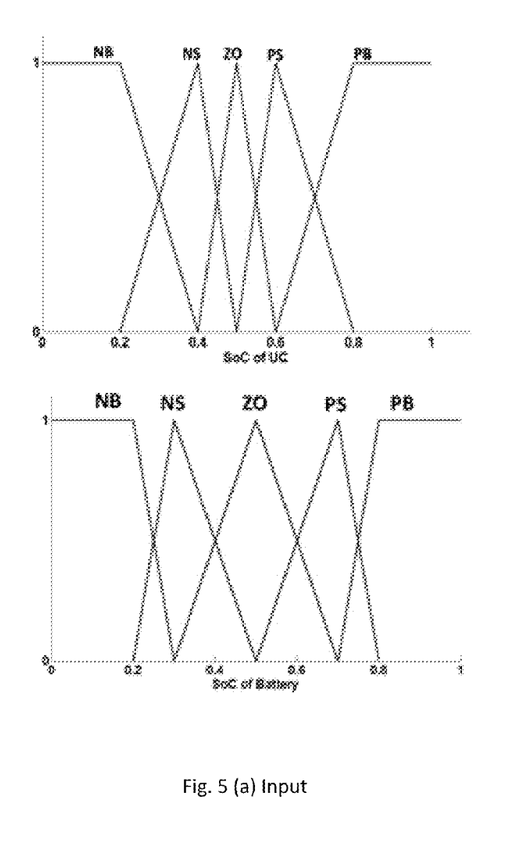

FIG. 4 shows the fuzzy-logic-based smoothing controller. The input and output membership contains five grades and seven grades separately as shown in FIGS. 5 (a) and (b). The output scaling factor is $K_1$. After applying those fuzzy rules, the $T_1$ is adjusted based on present SoC status of storage devices. For example, if the hybrid ESS is close to depletion or saturation, the output $\Delta T_1$ is negative.

The fuzzy rules take the priority to prevent the saturation or depletion of energy capacity, and ensure the sustainable system operation. The rules are described as follows:
1) If $SoC_{uc}$ is NB or $SoC_{be}$ is NB, $\Delta T_1$ is NB;
2) If $SoC_{uc}$ is PB or $SoC_{be}$ is PB, $\Delta T_1$ is NB;
3) If $SoC_{uc}$ is NS or $SoC_{be}$ is NS, $\Delta T_1$ is NS;
4) If $SoC_{uc}$ is PS or $SoC_{be}$ is PS, $\Delta T_1$ is NS;
5) If $SoC_{uc}$ is ZO and $SoC_{be}$ is ZO, $\Delta T_1$ is PB or ZO.

The membership function of $SoC_{be}$ and $SoC_{uc}$ can be updated when different unit sizes are applied in the PV system. For example, as a power-intensive storage, the UC usually presents a relatively fluctuating SoC profiles, and is prone to energy depletion and saturation, so PB and NB range takes up larger range than the battery.

C.1.2.2. Fuzzy-Logic-Based UC Power Control.

Figure 6:
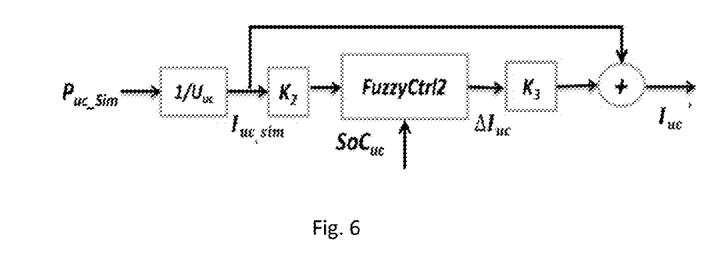
FIG. 6 shows a block diagram of a fuzzy UC power controller.
Figure 7:
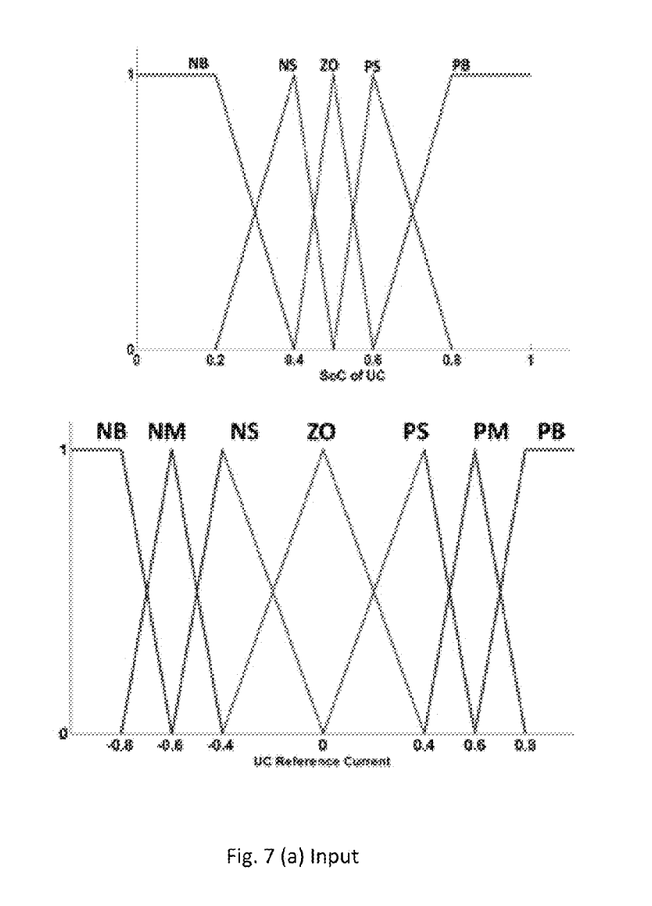

FIG. 6 shows the fuzzy-logic-based UC power controller. The scaling factor for the input and output variables are $K_2$ and $K_3$. The $K_2$ can simply take the value of maximum UC operating current. The membership of the input and output variables are shown in FIGS. 7 (a) and (b).

The controller adjusts the simulated UC reference current ($I_{uc,sim}$) by adding the deviating value ($\Delta I_{uc}$). The output of UC reference current ($I_{uc}^*$) can be directly applied on converter current control loop. The fuzzy rules are designed to prevent the UC from energy depletion or saturation. The rules are described as follows:
1) If $SoC_{uc}$ is NB, $\Delta I_{uc}$ is NB;
2) If $SoC_{uc}$ is NS and $I_{uc,sim}$ is PB, $\Delta I_{uc}$ is NM;
3) If $SoC_{uc}$ is NS and $I_{uc,sim}$ is PM, $\Delta I_{uc}$ is NS;
4) If $SoC_{uc}$ is NS and $I_{uc,sim}$ is PS, $\Delta I_{uc}$ is ZO
5) If $SoC_{uc}$ is ZO and $I_{uc,sim}$ is NB (PB), $\Delta I_{uc}$ is PS (NS);
6) If $SoC_{uc}$ is PB, $\Delta I_{uc}$ is PB;
7) If $SoC_{uc}$ is PS and $I_{uc,sim}$ is NB, $\Delta I_{uc}$ is PM;
8) If $SoC_{uc}$ is PS and $I_{uc,sim}$ is NM, $\Delta I_{uc}$ is PS;
9) If $SoC_{uc}$ is PS and $I_{uc,sim}$ is NS, $\Delta I_{uc}$ is ZO.

C.1.2.3. Fuzzy-Logic-Based Battery Power Control

The battery units are better preserved when the over-utilization of battery capacity and fast charging/discharging rate are avoided. Also considering the relative slow responding time of battery compared with UC system, it is better that they undergo relatively steady (less fluctuating) charging and discharging current.

Figure 8:
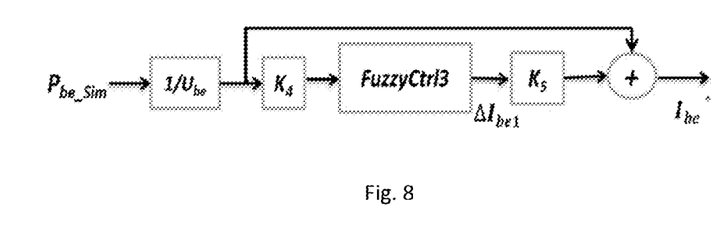
FIG. 8 shows a block diagram of Fuzzy BE power controller.
Figure 9:
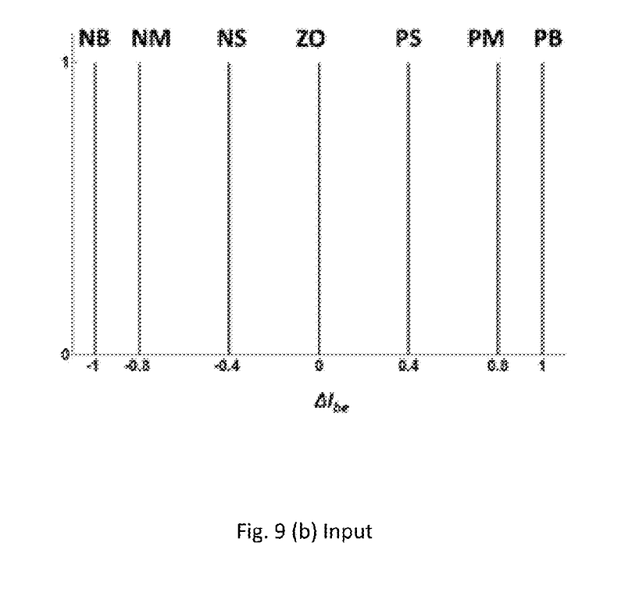

The SoC and battery current are chosen as the design factor in the controller. FIG. 8 shows the fuzzy-logic-based battery power controller. The scaling factor for the input and output variables are $K_4$ and $K_5$. The membership functions of the input and output variables are shown in FIGS. 9 (*a*) and (*b*).

The controller adjusts the simulated battery reference current ($I_{be,sim}$) by adding the deviating value ($\Delta I_{be}$). The output of battery reference current ($I_{be}^*$) can be directly applied on converter current control loop. The fuzzy rules are designed to prevent the UC from energy depletion or saturation. The rules are described as follows:

1) If $SoC_{be}$ is NB, $\Delta I_{be}$ is NB;
2) If $SoC_{be}$ is NS and $I_{be,sim}$ is PB, $\Delta I_{be}$ is NM;
3) If $SoC_{be}$ is NS and $I_{be,sim}$ is PM, $\Delta I_{be}$ is NS;
4) If $SoC_{be}$ is NS and $I_{be,sim}$ is PS, $\Delta I_{be}$ is ZO
5) If $SoC_{be}$ is ZO and $I_{be,sim}$ is NB (PB), $\Delta I_{be}$ is PS (NS);
6) If $SoC_{be}$ is PB, $\Delta I_{be}$ is PB;
7) If $SoC_{be}$ is PS and $I_{be,sim}$ is NB, $\Delta I_{be}$ is PM;
8) If $SoC_{be}$ is PS and $I_{be,sim}$ is NM, $\Delta I_{be}$ is PS;
9) If $SoC_{be}$ is PS and $I_{be,sim}$ is NS, $\Delta I_{be}$ is ZO.

These fuzzy controllers in the PMS are designed from the heuristic knowledge of the system operation. They can be fine-tuned through system simulation studies. Through a proper design of PMS, the system can be kept in sustainable operation status, these energy storage devices are preserved in good life cycles.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 10:
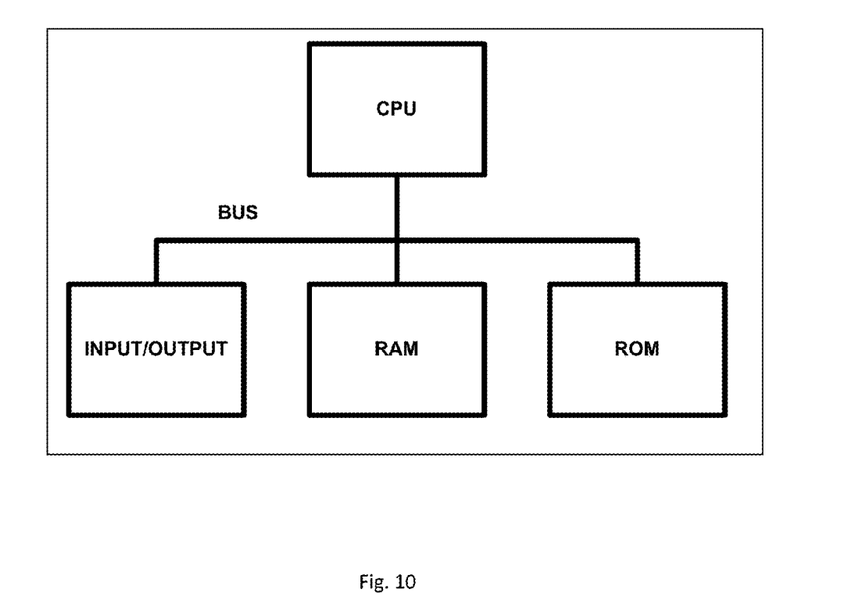
FIG. 10 shows an exemplary computer to perform the invention.

By way of example, a block diagram of a computer to support the system is shown in FIG. 10. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing it can be appreciated that the features and benefits of the invention What is the specific competitive/commercial value of the solution achieved by the present invention, e.g., less complexity, faster operation, lower cost, higher quality, etc. The present invention does not require a precise mathematical modeling or sophisticated computations, mainly rely on on-line system measurement; it is easy updating when different types of energy storage devices are applied, different component configuration (e.g. different unit size, different operation constraints, etc.); it requires less energy capacity from storage devices; and allows choose more practical signals as the control target which can be directly related with the dynamic characteristics and operation concerns of the energy storage devices.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising;
employing a fuzzy logic-based adaptive power management system in a an electrical energy system;
coupling a photovoltaic system to the power management system;
coupling a first capacitor based energy storage system to the power management system;
coupling a second battery energy based storage system to the power management system; and
coupling a storage of knowledge of system operation and operation of energy storage related devices within an electric energy system to the power management system, and a management storage system communicating with the photovoltaic system, first capacitor and battery based energy system and storage of knowledge for influencing energy fluctuations ahead of detailed control loops in power electronic devices, the fuzzy logic based adaptive system including a filter based power coordination layer for power conditioning among the energy based storage system and a fuzzy logic based control adjustment for monitoring operational status of all energy storage devices taking into account their dynamic characteristics for tuning control settings with the system adaptively and influencing optimal power or energy distributions within the system; and
prioritizing with fuzzy logic to prevent saturation or depletion of energy capacity with a priority to prevent saturation or depletion of energy capacity of the battery energy based storage system;
wherein the fuzzy logic based control adjustment comprises applying rules:
1) If $SoC_{uc}$ is NB or $SoC_{be}$, is NB, $\Delta T_1$ is NB;
2) If $SoC_{uc}$ is PB or $SoC_{be}$, is PB, $\Delta T_1$ is NB;
3) If $SoC_{uc}$ is NS or $SoC_{be}$, is NS, $\Delta T_1$ is NS;
4) If $SoC_{uc}$ is PS or $SoC_{be}$, is PS, $\Delta T_1$ is NS;
5) If $SoC_{uc}$ is ZO and $SoC_{be}$, is ZO, $\Delta T_1$ is PB or ZO,
where $SoC_{uc}$ is system operation of ultracapacitor, $SoC_{be}$, is system operation of the battery system, fuzzy variables of input and output are expressed as "positive big (PB)", "positive medium (PM)", "positive small (PS)", "Zero (ZO)", "negative big (NB)", "negative medium (NM)", "negative small (NS)", and $T_1$ is smoothing parameter.

2. The method of claim 1, wherein the filter based power coordination ensures that a supercapacitor storage device provides for compensating sudden changes in rapidly fluctuating PV output power while the battery covers a smoothing power profile, and during normal operation periods, the references for different energy storage devices work sufficiently with the references being modifiable under certain conditions in order to improve the overall system performance.

3. The method of claim 2, wherein the fuzzy logic based control adjustment comprises that during the system operation, the energy storage device will provide for keeping switching among different operation modes and present different dynamics, achieving smooth changes over various operation modes and maintaining consistent system performance including tuning the control along with those changes, and also providing advantages in non-linear system control without requiring a precise mathematical modeling or sophisticated computations in certain situations.

4. The method of claim 1, wherein the fuzzy logic based control adjustment comprises fuzzy logic based smoothing control, fuzzy logic based battery power control and fuzzy logic based ultracapacitor power control.

5. The method of claim 1, wherein the fuzzy logic based smoothing control comprises low pass filtering that influences a smoothing power profile, a difference between smoothing power and actual power being covered by discharging or charging of a hybrid electrical energy system, a parameter in the smoothing control determining a smoothing performance in that as the parameter becomes larger the more fluctuating power needs to be compensated by hybrid electric storage system which means more energy and power will be requested out of energy storages.

6. The method of claim 1, wherein the fuzzy logic based smoothing control comprises preventing the saturation or depletion of energy capacity, and ensuring sustainable system operation with states of charge for capacitance of the battery energy and ultracapacitor being updatable when different unit sizes are applied in the PV system, with a power-intensive storage the ultracapacitor may presents a relatively fluctuating state of charge profiles is prone to energy depletion and saturation so positive big and negative big range take up a larger range than a battery in the system.

7. The method of claim 1, whereinthe fuzzy logic based control adjustment comprises fuzzy logic based ultracapacitor power control adjusting a simulated ultracapacitor reference current by adding a deviating value, output of the ultracapacitor reference current being directly applicable on a converter current control loop, and including fuzzy rules for preventing the ultracapacitor from energy depletion or saturation.

8. The method of claim 1, wherein the fuzzy logic based control adjustment comprises fuzzy logic based battery power control adjusting a simulated battery reference current by adding a deviating value and an output of the battery reference current can be directly applied on a converter current control loop.

9. The method of claim 1, wherein fuzzy control in the fuzzy logic-based adaptive power management system comprises configuring from a heuristic knowledge of the system operation in the storage of knowledge, tuning the fuzzy control through system simulation and configuration of the adaptive power management system while keeping the system in a sustainable operation status and preserving energy storage devices acceptable life cycles.

10. The method of claim 1, wherein the fuzzy logic based control adjustment comprises fuzzy logic based smoothing control, fuzzy logic based battery power control and fuzzy logic based ultracapacitor power control.

* * * * *